Figure 1:
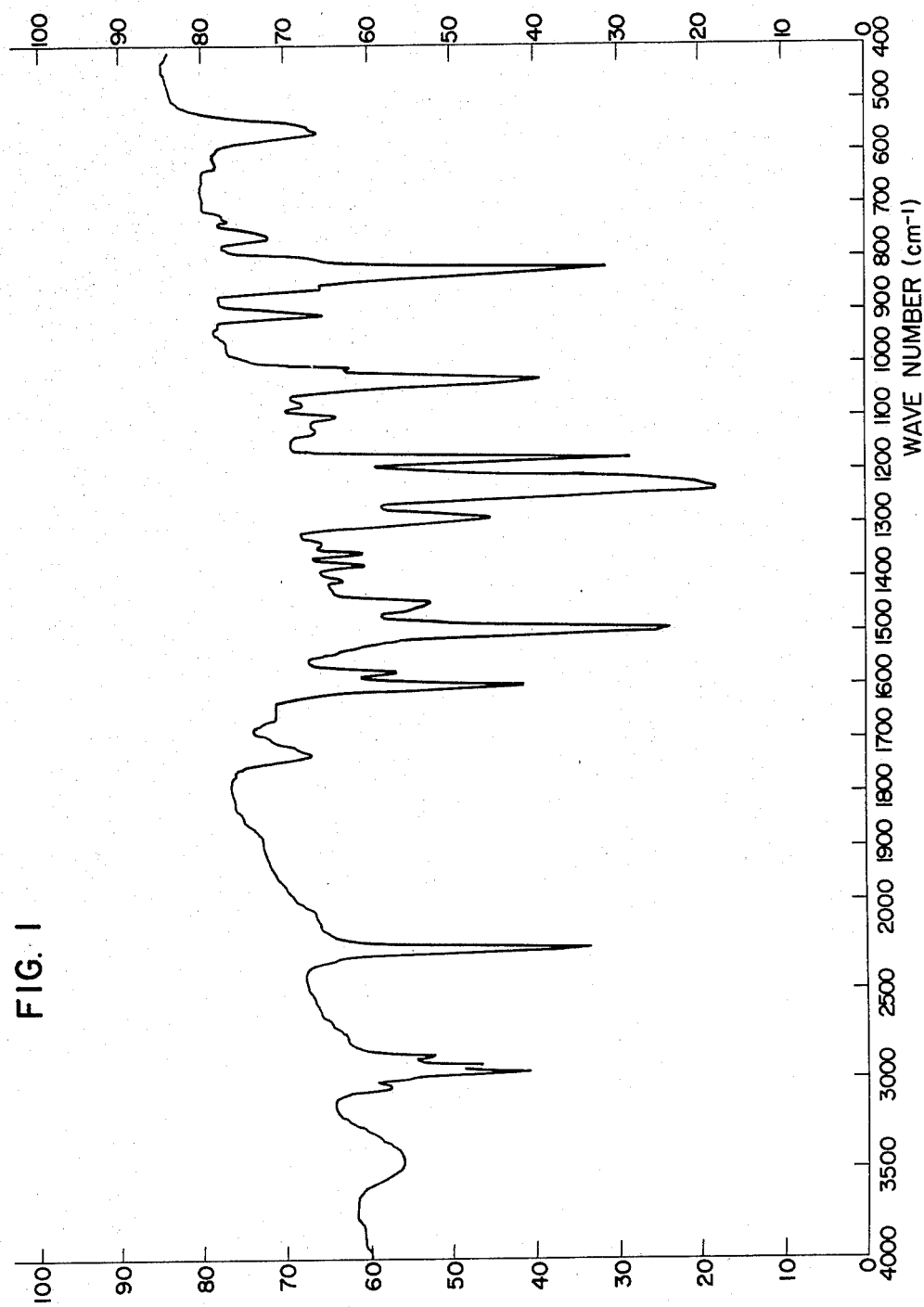

United States Patent [19]

Kaneko et al.

[11] 4,401,499

[45] Aug. 30, 1983

[54] CROSSLINKED RESIN OF EPOXY COMPOUND AND ISOCYANATE AND PROCESS FOR PRODUCING SAME

[75] Inventors: Shoroku Kaneko, Yokosuka; Sigenori Yamaoka, Yokohama; Masuo Mizuno, Yokohama; Yukihiro Okabe, Yokohama, all of Japan

[73] Assignee: Sumitomo Bakelite Company Limited, Japan

[21] Appl. No.: 326,306

[22] Filed: Dec. 1, 1981

[30] Foreign Application Priority Data

Jun. 9, 1980 [JP] Japan ................................. 55-76665
Jun. 9, 1980 [JP] Japan ................................. 55-76666
Feb. 6, 1981 [JP] Japan ................................. 56-15623

[51] Int. Cl.$^3$ ............................................. B32B 31/00
[52] U.S. Cl. .............................. 156/307.3; 156/307.7; 427/386; 525/113; 525/407
[58] Field of Search ................ 525/113, 407; 428/386; 156/299

[56] References Cited

U.S. PATENT DOCUMENTS 3,458,527 7/1969 Schramm et al. ................... 525/407

FOREIGN PATENT DOCUMENTS 53-14095 5/1978 Japan .

OTHER PUBLICATIONS

Peterson, Liebigs Ann. Chem., 562, 205 (1949).
Speranza et al., J. Or. Chem., 23, 1922 (1958).
Otsu et al., J. Applied Polymer Sci., 9, 1994 (1965).

*Primary Examiner*—Lewis T. Jacobs
*Attorney, Agent, or Firm*—Karl W. Flocks; Sheridan Neimark

[57] ABSTRACT

A crosslinked resin excellent in heat resistance, toughness, moisture resistance and adhesiveness can be obtained by the use of an epoxy compound having both alcoholic hydroxyl groups and epoxy groups in its molecule and an isocyanate compound having isocyanate groups in its molecule by first reacting the alcoholic hydroxyl groups of said epoxy compound and the isocyanate groups of said isocyanate compound to produce an epoxy prepolymer having urethane linkages stable at room temperature, followed by dissociating the urethane linkages of the prepolymer to regenerate the isocyanate groups and reacting said isocyanate groups with the epoxy groups of said epoxy compound. By carrying out the above-mentioned reaction between the isocyante groups and the epoxy groups in the presence of at least one member selected from the group consisting of amine compounds, carboxylic acid anhydrides, phenol novolac compounds and polyvinyl-phenol compounds and/or a bisimide compound, a crosslinked resin having higher heat resistance can be produced. Said prepolymer is excellent in storage stability and suitable for use in the production of laminates.

17 Claims, 2 Drawing Figures

CROSSLINKED RESIN OF EPOXY COMPOUND AND ISOCYANATE AND PROCESS FOR PRODUCING SAME

This invention relates to a crosslinked resin of an epoxy compound and an isocyanate compound excellent in heat resistance, toughness, moisture resistance, adhesiveness, etc. as well as to a process for producing said resin. Further, this invention relates to a process for producing resins which are most suitable for the production of laminates, molded articles and the like via the so-called B-stage reaction intermediates such as prepreg or molding material.

As curing agents for curing epoxy compounds, there have hitherto been known acid anhydrides, aliphatic and aromatic amine compounds, phenol compounds and the like. Though the epoxy compounds cured with these curing agents were excellent in adhesiveness, toughness, moisture resistance, etc., they had the fault that the heat decomposition temperature and the heat softening temperature thereof were lower than those of cured polyimide resins and cured silicone resins. Therefore, they have not been able to respond sufficiently to the current tendency to require a high reliability in electronic appliances and the like, and have not been applied to uses requiring high reliability. On the other hand, polyimide resins and silicone resins are inferior in toughness, adhesiveness, moisture resistance, processability and workability which epoxy resins have, though they are superior in heat resistance, and moreover they are expensive, so that their use has extremely been limited.

It is well known that an addition reaction takes place between an epoxy compound and an isocyanate compound in the presence of a catalyst to form a cyclic oxazolidone compound as expressed by the following formula (I):

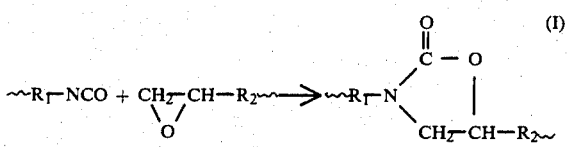

(for example, G. P. Speranza and W. J. Reppel, J. Org. Chem., 23, 1922 (1958)). In such an addition reaction of isocyanate compound to epoxy compound, the reaction product has a cyclic structure, and therefore, it is much superior in heat resistance to the reaction products of ring-opening addition reaction of the following formula (II) in which an amine compound, an acid anhydride, a phenolic compound or the like adds to an epoxy compound to yield a chain-like structure:

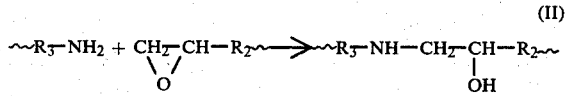

That is, the cyclic structure is stiffer than chain structure, and the change in motion of main chain is smaller even though heat energy is applied from the exterior, so that the cyclic structure has a higher glass transition point. Furthermore, unlike chain structure, a bond scission at one position in the cyclic structure does not result in any reduction in molecular weight, so that the heat decomposition temperature becomes higher.

Though the ring-forming addition reaction of isocyanate compound to epoxy compound can give a cured product excellent in heat resistance as mentioned above, this process had a fault that the materials used are quite poor in storage stability at room temperature in that the reaction progresses even at room temperature owing to the very high reactivity of isocyanate group, that the isocyanate group is readily denatured by the reaction with the moisture in the air, and so on. Said very high reactivity of isocyanate compounds is an important restriction on their use. In the field of urethane resin coating material, however, there is taken a measure of masking the isocyanate group with phenol, cresol or the like to make it stable at room temperature in order to enhance the storage stability and, at the time of curing, dissociating and evaporating off the masking agent by the action of heat, thereby regenerating the isocyanate group, and utilizing it in the curing reaction. Such a method of masking the isocyanate group has been studied since a good many years ago (S. Peterson: Liebigs Ann. Chem., 562, 205 (1949)).

In Japanese Patent Publication No. 14,095/78, this process is used as it is when curing an epoxy compound with an isocyanate compound. That is, the isocyanate group is previously reacted with a masking agent such as phenol, cresol or the like to convert it to a urethane compound stable at room temperature, and this urethane compound is heated at the time of curing to dissociate and evaporate off and masking agent thereby regenerating the isocyanate group, and this generated isocyanate group is reacted with the epoxy group. According to this process, however, the working environment is markedly polluted by the dissociated masking agent. Furthermore, when a laminate or a molded article is to be cured and formed, the dissociated masking agent remains in the laminate or molded product which produces voids and deteriorate the appearance, and, in addition, greatly decreases the mechanical strength, heat resistance, moisture resistance, etc. of the final product. Therefore, this process is by no means applicable to practical uses.

As a result of extensive research, the present inventors have solved the above-mentioned problems in the prior art arising at the time of cure. That is, they have succeeded in obtaining a prepolymer in the B-stage stable at room temperature and also obtaining therefrom a cured product excellent in various performances which emits no volatile matter and therefore is free from voids, unlike the prior art materials.

According to this invention, there is provided a crosslinked resin obtained by contacting an epoxy compound having alcoholic hydroxyl groups and epoxy groups in its molecule with an isocyanate compound having isocyanate groups in its molecule under mild conditions to react said alcoholic hydroxyl group with said isocyanate group to produce a prepolymer having urethane linkages stable at room temperature, along with the free epoxy groups, then subjecting said prepolymer to the conditions that said urethane linkages are dissociated to regenerate the isocyanate groups and reacting the regenerated isocyanate groups with the epoxy groups of said epoxy compound. Further, according to this invention, there is also provided a process for producing said crosslinked resin.

The crosslinked resin of this invention is quite excellent in appearance, heat resistance, toughness, adhesive properties, moisture resistance, etc.

The first characteristic feature of this invention consists in subjecting an epoxy compound having alcoholic hydroxyl groups and epoxy groups in its molecule with an isocyanate compound having isocyanate groups in its molecule to reaction conditions to react the alcoholic hydroxyl groups with the isocyanate groups, thereby forming a prepolymer having urethane linkages stable at room temperature. Though this reaction can take place even at low temperatures, it is completed rapidly upon heating. However, since the dissociation of the formed urethane linkages or side reactions can take place at too high a temperature, the reaction is carried out at a temperature of 200° C. or below, and preferably 100° C. or below.

As mentioned above, in this invention, the isocyanate groups are masked with alcoholic hydroxyl groups in the first place. Therefore, the prepolymer of this invention has a very good storage stability and has a pot life of at least 2 months in the form of a prepreg or a molding material in the B-stage.

At the time of final cure, this prepolymer is heated to dissociate the urethane linkages and regenerate the isocyanate groups, and the regenerated isocyanate groups are reacted with epoxy groups to form an oxazolidone rings. Since the epoxy compound having the alcoholic hydroxyl groups which have been a masking agent for the isocyanate group also reacts in the stage of the final cure, the forming of molded products such as laminate can be practised without emission of volatile matter nor formation of void, unlike the case of masking with phenol, cresol or the like, and a cured product excellent in various performances can be obtained.

Further, if at least one member selected from the group consisting of amine compounds, carboxylic acid anhydrides, phenol novolac compounds, polyvinylphenol compounds and bisimide compounds exists in the stage of final cure, various linkages can be introduced and an excellent crosslinked product (i.e. cured product) having characteristic features corresponding to them can be obtained. For example, in the presence of at least one member selected from the group consisting of amine compounds, carboxylic acid anhydrides, phenol novolac compounds and polyvinyl phenol compounds, a reaction between these compounds and the epoxy group can take place in addition to the oxazolidone ring formation due to the reaction between the epoxy group and the isocyanate group dissociated and regenerated from the urethane linkage, so that the cured product has excellent heat resistance in addition to the excellent toughness, adhesiveness, moisture resistance, etc. which the conventional cured epoxy resins have. Further, if a bisimide compound exists in the stage of final cure, an imide linkage is introduced into the cured product owing to the thermal polymerization of the bisimide, so that the heat resistance of the cured product becomes higher. Further, if a bisimide compound and at least one member selected from the group consisting of amine compounds, carboxylic acid anhydrides, phenol novolac compounds and polyvinyl-phenol compounds coexist in the stage of final cure, the formation of oxazolidone ring due to the reaction between the isocyanate group and the epoxy group, the thermal polymerization of the bisimide compound, the ring-opening cure with the amine compound, acid anhydride, phenol-novolac compound or polyvinyl-phenol compound, the addition of the amine compound to the bisimide compound and so on take place, so that the cured product has very excellent heat resistance, toughness, adhesiveness, moisture resistance, etc. Heating is necessary at the time of final cure, and the heating temperature is preferably 50°–300° C., more preferably 100°–200° C. Moreover, it is preferred that the heating temperature is at least 40° C. higher than the aforementioned reaction temperature for forming a prepolymer having urethane linkages. If the heating temperature is less than 50° C., the curing reaction cannot take place sufficiently. If it is more than 300° C., decomposition reactions and the like can take place in addition to the curing reaction so that the properties of cured product are deteriorated.

The urethane linkage formed by masking the isocyanate group with the alcoholic hydroxyl group in this invention has a higher dissociation temperature than the hitherto known urethane linkage formed by masking the isocyanate groups with phenolic hydroxyl groups. Therefore, the dissociation of the urethane linkage and the formation of free isocyanate group cannot take place in, for example, the drying step for preparing a prepreg for laminate or the high temperature kneading step for preparing a B-stage molding material, and hence, a very stable prepreg, molding material and the like can be obtained.

An example of the process of this invention will be explained below with reference to reaction formulas:

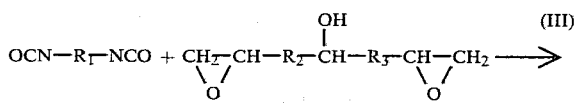

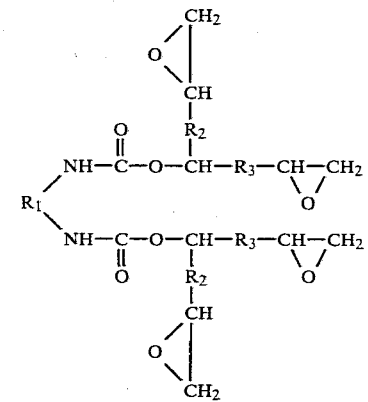

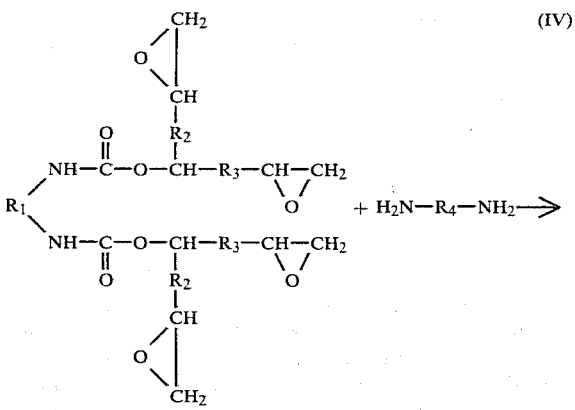

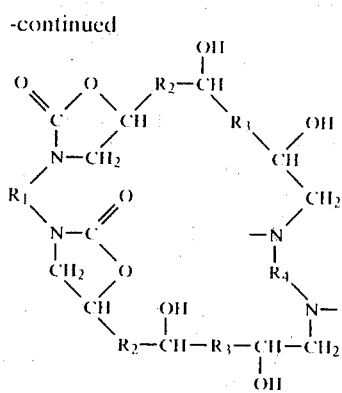

In the above formulas, $R_1$, $R_2$, $R_3$ and $R_4$ represent independently organic groups having at least one carbon atom.

First, as shown in formula (III), the isocyanate group of the isocyanate compound is reacted with the alcoholic hydroxyl group of the epoxy compound to produce an epoxy prepolymer stable at room temperature.

Then, an amine compound, for example, is added to the prepolymer and final cure is carried out. Thus, as shown in formula (IV), the formation of an oxazolidone ring by the isocyanate group-epoxy group reaction, the reaction between the amino group and the isocyanate group and so on take place, and the cured product becomes quite excellent in heat resistance, toughness, moisture resistance, etc. When a carboxylic acid anhydride, a phenol novolac compound or a polyvinylphenol compound is added to this prepolymer, a reaction takes place between the epoxy group and the acid anhydride group or between the epoxy group and the hydroxyl group of the phenol novolac or polyvinylphenol compound, in addition to the formation of an oxazolidone ring by the isocyanate group-epoxy group reaction, and the cured product also has the same structure as in the conventional cured epoxy resin as in the case of adding an amine compound. Thus, there can be obtained a cured product simultaneously having so excellent heat resistance as not to be seen in the conventional cured epoxy resin and the excellent adhesiveness, toughness, moisture resistance, etc. which the conventional cured epoxy resins have.

Further, if a bisimide compound is mixed, a thermal polymerization of the double bond of the bisimide compound takes place, and there also occurs an addition of the amino group to the double bond in the presence of an amine compound, so that the imide group is introduced into the cured product. Thus, a cured product excellent in heat resistance, toughness, adhesiveness, moisture resistance, etc. and very well balanced properties can be obtained.

In this invention, the epoxy compound having alcoholic hydroxyl groups and epoxy groups in its molecule may be used either alone or in admixture with an epoxy compound free from alcoholic hydroxyl group. Examples of the compound having both alcoholic hydroxyl group and epoxy group in its molecule include diglycidyl ethers having alcoholic hydroxyl groups obtained by the reaction of epichlorohydrin and Bisphenol A, Bisphenol F or hydrogenated Bisphenol A; diglycidyl ethers having alcoholic hydroxyl groups obtained by the reaction of β-methyl-substituted epichlorohydrin and Bisphenol A; diglycidyl ethers having alcoholic hydroxyl groups obtained by the reaction of epichlorohydrin and oxybenzoic acid; compound obtained by partially converting the hydroxyl groups of polyol compounds, such as propylene triol, butylene triol and the like, to glycidyl ether; brominated products of the above-mentioned epoxy compounds; and so on. On the other hand, examples of said epoxy compound free from alcoholic hydroxyl group include polyglycidyl ethers of phenol novolac or cresol novolac; diglycidyl ethers of polyhydric phenols such as resorcinol, hydroquinone, catechol and the like; diglycidyl ethers of aromatic dicarboxylic acids; vinylcyclohexene diepoxide; dicyclopentadiene diepoxide; diglycidyl methylhydantoin; triglycidyl isocyanurate; diglycidyl ethers free from alcoholic hydroxyl group obtained by the reaction between epichlorohydrin and Bisphenol A, Bisphenol F, hydrogenated Bisphenol A or oxybenzoic acid; diglycidyl ethers free from alcoholic hydroxyl group obtained by the reactions between β-methyl-substituted epichlorohydrin and Bisphenol A; brominated products of the above-mentioned epoxy compounds; and so on. Among these epoxy compounds having alcoholic hydroxyl group, excellent are the diglycidyl ethers having an average molecular weight of 400–1,000 derived from Bisphenol A and epichlorohydrin, which produce cured products excellent in electrical properties, toughness and adhesiveness, and which are most largely produced industrially. If the average molecular weight is less than 400, the content of alcoholic hydroxyl group is so small that the action as a masking agent for isocyanate group decreases and a B-stage compound stable at room temperature is difficult to obtain. If the molecular weight is more than 1,000, the crosslinking density of the final cured product is too low and the heat resistance is reduced.

In this invention, examples of the isocyanate compound having isocyanate groups in its molecule include methane diisocyanate, ethane-1,2-diisocyanate, butane-1,1-diisocyanate, butane-1,2-diisocyanate, butane-1,4-diisocyanate, propane-1,3-diisocyanate, trans-vinylene diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, ω,ω'-1,3-dimethylbenzene diisocyanate, ω,ω'-1,4-dimethylbenzene diisocyanate, ω,ω'-1,3-dimethylcyclohexane diisocyanate, ω,ω'-1,4-dimethylcyclohexane diisocyanate, ω,ω'-1,3-dimethylnaphthalene diisocyanate ω,ω'-1,4-dimethylnaphthalene diisocyanate, ω,ω'-1,5-dimethylnaphthalene diisocyanate, cyclohexane-1,3-diisocyanate, cyclohexane-1,4-diisocyanate, dicyclohexylmethane-4,4'-diisocyanate, 1,3-phenylene diisocyanate, 1,4-phenylene diisocyanate, 2,4-tolylene diisocyanate, 2,5-tolylene diisocyanate, 2,6-tolylene diisocyanate, 3,5-tolylene diisocyanate, diphenyl ether-4,4'-diisocyanate, diphenyl ether-2,4-diisocyanate, napthalene-1,4-diisocyanate, naphthalene-1,5-diisocyanate, biphenyl-4,4'-diisocyanate, 3,3'-dimethylbiphenyl-4,4'-diisocyanate, 2,3-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenyl sulfide-4,4'-diisocyanate, diphenylsulfone-4,4'-diisocyanate, polymethylenepolyphenyl isocyanate, triphenylmethane triisocyanate, triphenyl isocyanate, tris(4-phenyl isocyanate thiophosphate), 3,3',4,4'-diphenylmethane tetraisocyanate and the like, as well as their polymers such as dimer, trimer, tetramer, pentamer and the like. Some of these compounds have an isocyanurate ring in molecule, examples of which are preferably trimers of 2,4-tolylene diisocyanate, 2,5-tolylene diisocyanate, 2,6-tolylene diisocyanate and 3,5-tolylene diisocyanate, a trimer of hexane-1,6-diisocyanate, a copolymer of 2,4-tolylene, 2,5-tolylene, 2,6-tolylene or 3,5-tolylene diisocyanate and hexane-1,6-diisocyanate, and when they are used a product excellent in heat resistance can be obtained owing to the high heat stability of the isocyanurate ring.

In this invention, the proportions of the epoxy compound having alcoholic hydroxyl groups and the isocyanate compound may be selected appropriately. Preferably, however, they are used in a proportion of 0.5–10 equivalents of epoxy group and at least one equivalent of alcoholic hydroxyl group per equivalent of isocyanate group. If the amount of the epoxy group is less than 0.5 equivalent per equivalent of isocyanate group, there is a tendency that many urethane linkages or free isocyanate groups remain in the final cured product so that the heat resistance and moisture resistance of the cured product decrease. If the amount of the epoxy group exceeds 10 equivalents, the proportion of oxazolidone ring in the final cured product becomes small, and heat resistance decreases. On the other hand, if the amount of the alcoholic hydroxyl group is less than one equivalent per equivalent of isocyanate group, a large amount of free isocyanate remains in the epoxy prepolymer, so that the storage stability decreases.

Examples of the amine compound usable in this invention include aliphatic amines such as ethylenediamine, propylenediamine, diethylenetriamine, iminobispropylamine, triethylenetetramine, tetraethylenepentamine, diethylaminopropylamine, aminoethylethanolamine, m-xylylenediamine, tetrachloro-p-xylylenediamine, cyanoethylated diethylenetriamine and the like; alicyclic amines such as methanediamine, N-aminoethylpiperazine, 1,3-diaminocyclohexane, isophoronediamine and the like; aromatic amines such as o-phenylenediamine, m-phenylenediamine, p-phenylenediamine, diaminodiphenyl ether, diaminodiphenyl sulfone, diaminodiphenylmethane, benzidine, 4,4'-bis(o-toluidine), 4,4'-thiodianiline, dianisidine, methylenebis(o-chloroaniline), 2,4-toluenediamine, bis(3,4-diaminophenyl)sulfone, diaminoditolylsulfone, 2,6-diaminopyridine, 4-chloro-o-phenylenediamine, 4-methoxy-6-methyl-m-phenylenediamine, m-aminobenzylamine and the like; secondary and tertiary amines such as piperidine, pyrrolidine, morpholine, N-methylmorpholine, pyridine, benzyldimethylamine, tris(dimethylaminomethyl)phenol and the like; polyamide having terminal amino group produced from linolenic acid dimer and ethylenediamine or diethylenetriamine; dicyandiamide; boron trifluoride-amine complex; imidazole compounds; and so on. Among them, aromatic amine compounds and dicyandiamide are particularly useful on the point that the storage stability in the B stage is good.

Examples of the carboxylic acid anhydrides usable in this invention include phthalic anhydride, itaconic anhydride, succinic anhydride, alkenic anhydride, dodecenylsuccinic anhydride, tricarballylic anhydride, linoleic acid adduct of maleic anhydride, chlorendic anhydride, maleic anhydride-vinyl ether copolymer, maleic anhydride-styrene copolymer, nadic anhydride, methylnadic anhydride, hexahydrophthalic anhydride, methylhexahydrophthalic anhydride, tetrahydrophthalic anhydride, methyltetrahydrophthalic anhydride, trimellitic anhydride, pyromellitic anhydride, cyclopentane-tetracarboxylic anhydride, benzophenone-tetracarboxylic anhydride, benzotetracarboxylic anhydride, ethylene glycol-bis(trimellitate), glycerin-tris(trimellitate) and the like.

The phenol novolac compounds usable in this invention are those produced by reacting a phenol such as phenol, cresol, xylenol, trimethylphenol, allylphenol, alkenylphenol, resorcinol, hydroquinone, pyrocatechol, pyrogallol or the like with formaldehyde, paraformaldehyde or the like in the presence of an acid catalyst. The polyvinyl-phenol compounds usable in this invention are polymers comprising as the monomeric unit o-vinylphenol, m-vinylphenol, p-vinylphenol or a mixture thereof as represented by the following formulas, which may be halogenated:

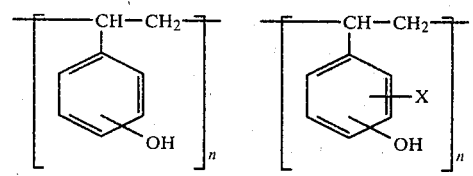

wherein X is a halogen.

Said polyvinylphenol compounds can be produced easily by polymeizing the vinylphenols of the above-mentioned formulas by, for example, thermal polymerization, ionic polymerization or the like.

The bisimide compounds usable in this invention are compounds represented by the following formula:

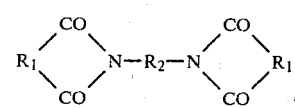

wherein $R_1$ represents a divalent organic residue having carbon-carbon double bond and $R_2$ represents a divalnet organic residue having at least two carbon atoms. Example of said bisimide compound include N,N'-ethylene-bismaleimide, N,N'-hexamethylene-bismaleimide, N,N'-m-phenylene-bismaleimide, N,N'-p-phenylene-bismaleimide, N,N'-4,4'-diphenylmethane-bismaleimide, N,N'-4,4'-diphenylether-bismaleimide, N,N'-4,4'-diphenylsulfone-bismaleimide, N,N'-4,4'-dichlorohexylmethane-bismaleimide, N,N'-α,α'-4,4'-dimethylenecyclohexane-bismaleimide, N,N'-m-xylylene-bismaleimide, N,N'-diphenylcyclohexane-bismaleimide and the like.

In this invention, when at least one member selected from the group consisting of amine compounds, carboxylic acid anhydrides, phenol novolac compounds and polyvinyl-phenol compounds is mixed with the prepolymer obtained by reacting the alcoholic hydroxyl group of the epoxy compound having alcoholic hydroxyl group with the isocyanate group of the polyisocyanate compound, the proportions of the compounds may be selected appropriately depending on the purposes. Preferably, however, 0.1–2 equivalents of amine, 0.1–2 equivalents of acid anhydride or 0.1–2 equivalents of hydroxyl group is used per equivalent of the epoxy group of said prepolymer. If the amount exceeds 2 equivalents, the amine compound, the polycarboxylic acid anhydride, the phenol novolac compound or the polyvinyl-phenol compound is apt to remain unreacted, so that heat resistance, moisture resistance and chemical resistance decrease. On the other hand, in mixing a bisimide compound, the amount of the bisimide compound may also be selected appropriately depending upon the purposes. Preferably, however, it is 100 parts by weight or less per 10 parts by weight of the prepolymer. If the amount of the bisimide compound is larger than the above, the cured product is apt to become so brittle that the toughness decreases. When a bisimide compound is mixed, a simultaneous mixing of an organic peroxide is useful because it remarkably enhance the curing velocity.

In this invention, the addition of a catalyst is useful because it enables the reaction to prgress more rapidly. As the catalyst of this invention, those convetionally used as urethane group-forming catalyst or as oxazolidone ring-forming catalyst may be employed. Examples of said catalyst include quaternary ammonium salts such as cetyltrimethylammonium bromide, cetyltrimethylammonium chloride, dodecyltrimethylammonium iodide, trimethyldodecylammonium iodide, trimethyldodecylammonium chloride and the like; metal halides such as lithium chloride, tin chloride, iron chloride, zinc chloride, aluminum chloride and the like; metal alkoxides and phenoxides such as lithium butoxide, potassium butoxide, aluminum isopropoxide, aluminum phenoxide, calcium ethoxide, magnesium ethoxide and the like; cobalt naphthenate; organometallic compounds such as tetrabutyltin, trimethyltin hydroxide, dimethyltin dichloride, dibutyltin dilaurate and the like; and imidazole compounds such as 2-methylimidazole, 2-ethylimidazole, 2-phenylimidazole, 2-ethyl-4-methylimidazole, 2-phenyl-4-methylimidazole, 1-benzyl-2-methylimidazole, 2-isopropylimidazole, 1-cyanoethyl-2-methylimidazole, 1-cyanoethyl-2-ethyl-4-methylimidazole, 1-cyanoethyl-2-isopropylimidazole, 1-cyanoethyl-2-phenylimidazole, 2-undecylimidazole, 2-heptadecylimidazole, 1-cyanoethyl-2-undecylimidazole, 1-azine-2-methylimidazole, 1-azine-2-ethyl-4-methylimidazole, 1-azine-2-undecylimidazole and the like. Further, various amines such as trimethylamine, triethylamine, benzyldimethylamine, tris(dimethylaminomethyl)phenol, tetramethylbutanediamine, N-methylmorpholine, N-ethylmorpholine, triethylenediamine and the like also have a catalytic action.

The above-mentioned catalysts are useful because, if at least one of them is added, the reaction progresses rapidly. The catalyst may be added at the time of reacting the isocyanate group with the alcoholic hydroxyl group to form a prepolymer, or it may also be added at the stage of final cure.

If necessary, various additives such as flame retardant, pigment, dye, reinforcing agent and the like; fillers; and the like, may be added in this invention.

The process for producing a crosslinked resin of this invention can advantageously be applied to the production of a laminate. In this case, the laminate can be produced by reacting an epoxy compound having epoxy groups and alcoholic hydroxyl groups in the molecule with an isocyanate compound having isocyanate groups in the molecule to form an epoxy prepolymer having urethane linkages resulting from the reaction between the isocyanate groups with the alcoholic hydroxyl groups, optionally adding to the prepolymer a bisimide compound and/or at least one member selected from the group consisting of amine compounds, carboxylic acid anhydrides, phenol novolac compounds, polyvinylphenol compounds to prepare a resin composition, impregnating a fibrous substrate with said resin composition, superposing at least one sheet of the resin-impregnated substrate on a metallic foil, and pressing the resulting assembly with heating.

The fibrous substrate which may be used in this invention includes fibrous materials which can be impregnated with resins, for example, fabrics of glass fibers; fabrics of synthetic fibers such as polyester fiber, polyvinyl alcohol fiber, polyamide fiber, and the like; cotten fabrics; fabrics of carbon fiber; paper; and the like. As the metal foil which may be used in this invention include copper foil, aluminum foil, gold foil, nickel foil and the like, and may, optionally, have been suggested to surface-roughening treatment or coating with an adhesive.

Figure 2:
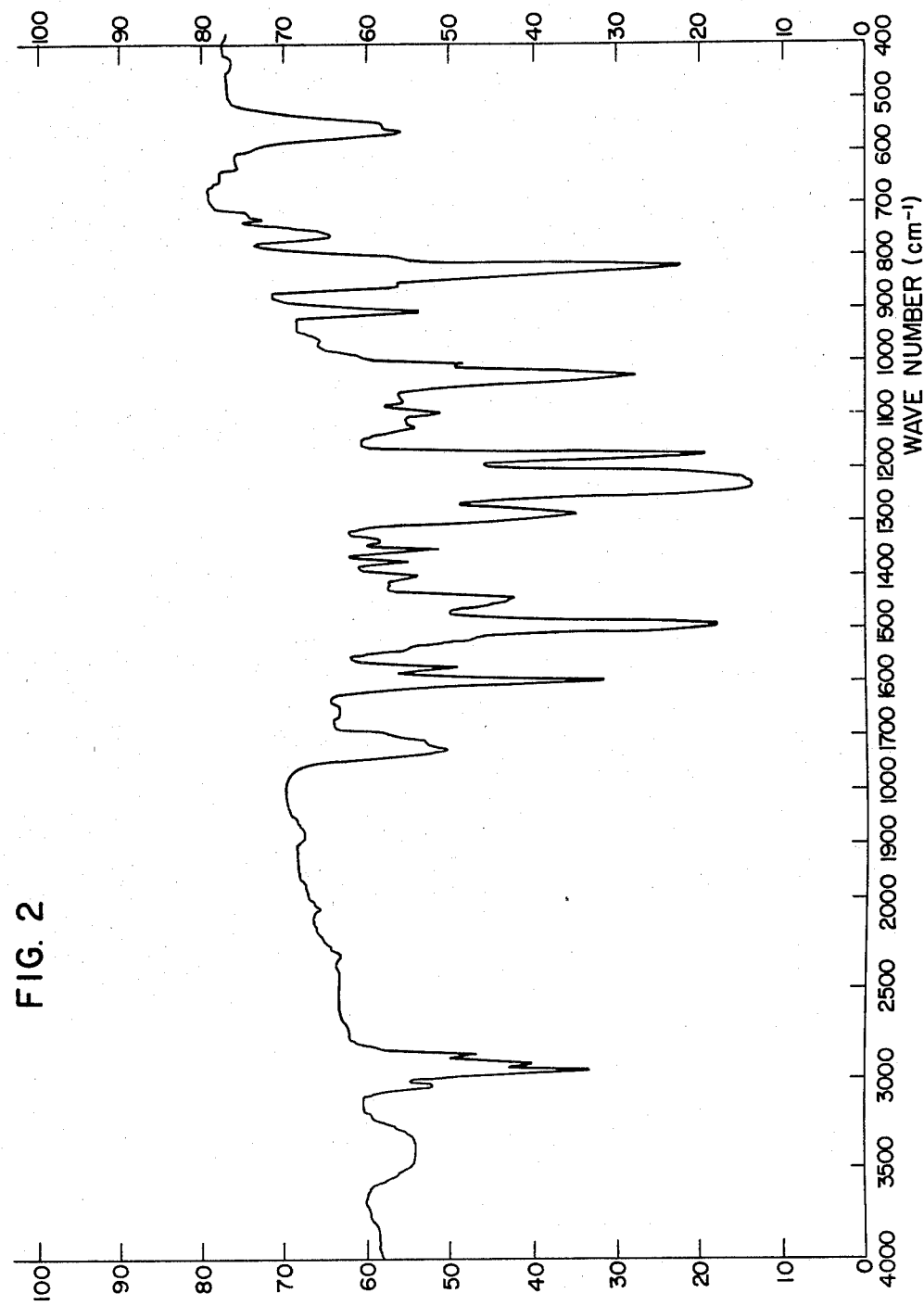

This invention is explained in more detail below referring to Examples and the accompanying drawings in which FIGS. 1 and 2 show infrared absorption spectra of the prepolymers obtained in Example 1. Said Examples are merely by way of illustration and not by way of limitation.

EXAMPLE 1

In 950 g of methyl ethyl ketone (MEK) were dissolved 100 g of 2,4-tolylene diisocyanate, 850 g of diglycidyl ether having an average molecular weight of about 700, an epoxy equivalent of about 340 and an alcoholic hydroxyl equivalent of about 700 obtained by the reaction of Bisphenol A and epichlorohydrin, and 2 g of 2-methylimidazole to obtain a solution of a concentration of 50% by weight. This solution was heated to 70° C. and stirred. Ten minutes after the start of heating and stirring, the infrared absorption spectrum of the solution was measured by a liquid film method by the use of KRS-5. The result of the measurement is shown in FIG. 1. Five hours after the start of heating and stirring, the infrared absorption spectrum of the solution was again measured by the same method as above, to obtain the result shown in FIG. 2. The absorption of isocyanate group at 2250 cm$^{-1}$ observed in FIG. 1, disappeared in FIG. 2 and the absorption of urethane linkage at 1730 cm$^{-1}$ in FIG. 2 is greater than that in FIG. 1. The absorption of epoxy group at 910 cm$^{-1}$ shows no change. From these facts, it can be understood that the isocyanate group of 2,4-tolylene diisocyanate was masked by the alcoholic hydroxyl group of epoxy compound and a prepolymer stable at room temperature was formed.

Then, a varnish was prepared by adding 70 g of 4,4'-diaminodiphenylsulfone to the solution. A prepreg was prepared by impregnating a glass cloth with the varnish and drying it at 130° C. for 5 minutes. Ten sheets of the prepreg were put on one another and the resulting assembly was placed between two copper foils having a thickness of 35 μm, after which it was press-molded at 170° C. for 2 hours under a pressure of 40 kg/cm$^2$ to obtain a double copper-clad laminate having a thickness of 1.6 mm. This double copper-clad laminate had a high flexural strength at high temperatures and excellent heat resistance as shown in Table 2. The result of punching test was also good enough to show a high toughness, its soldering heat-resistance did not decrease even after boiling treatment, and its moisture resistance was excellent. When the prepreg was allowed to stand at room temperature for 30 days and thereafter press-molded, there was obtained a copper-clad laminate having quite the same good appearance as the appearance obtainable by molding the prepreg just after its preparation. Further, as shown in Table 2, the performance of the copper-clad laminate were as excellent as those of the laminate obtained by molding just after the preparation of prepreg.

Moreover, the period of time taken until the flow of the resin in the prepreg became 1/5 of the initial value was measured. The results are shown in Table 1, which demonstrate that the flow of the resin in the prepreg was maintained more than 1/5 of the initial value, even after the lapse of 60 days.

A multi-layer board (6 layers) having a thickness of 2.2 mm was prepared from the prepreg. The prepreg exhibited quite excellent moldability and processability in the many steps of multi-layer board preparation including preparation of inner layer material, multi-layer forming, drilling, through-hole plating, preparation of surface circuit, etc. The 6-layer board thus obtained exhibited not only excellent soldering heat-resistance and bonding strength of copper foil to the prepreg, but also no formation of the so-called smear, namely the adhesion of resin to copper foils of inner layer, at the time of drilling, so that the continuity of through-hole was perfect.

EXAMPLE 2

In 600 g of MEK were dissolved 100 g of diphenylmethane-4,4'-diisocyanate, 500 g of diglycidyl ether having an average molecular weight of about 950, an epoxy equivalent of about 480 and an alcoholic hydroxyl equivalent of about 50 obtained by the reaction of Bisphenol A and epichlorohydrin, 2 g of 2-phenylimidazole, to prepare a siolution of a concentration of 50% by weight. In the same manner as in Example 1, the solution was stirred at 70° C. for 6 hours and the infrared absorption spectrum was measured to find that the isocyanate group had been masked by the alcoholic hydroxyl group of the epoxy compound and a prepolymer stable at room temperature was formed. The solution was thrown into 5 kg of n-hexane, and the resulting prepolymer was recovered. A molding material was prepared by mixing together 190 g of the recovered prepolymer, 12 g of nadic anhydride, 500 g of powdery silica, 1 g of lithium chloride, 0.5 g of carbon black and 1 g of zinc stearate and kneading the resulting mixture on a hot roll at 70° C. for 10 minutes. The spiral flow measured just after the kneading was 85 cm. After allowing this molding material to stand at room temperature for 30 days, its spiral flow was again measured to obtain a result of 82 cm which demonstrated that only a slight change took place. When this molding material was molded at 170° C. for 5 minutes and then after-baked at 170° C. for 16 hours, its glass transition point was as high as 210° C., demonstrating such excellent heat resistance that none of the conventional epoxy resin molded articles had.

EXAMPLE 3

In 600 g of MEK were dissolved 100 g of 4,4',4"-trimethyl-3,3',3"-triisocyanate 2,4,6-triphenyl isocyanurate (trimer of 2,4-tolylene diisocyanate), 500 g of diglycidyl ether having an average molecular weight of about 700, an epoxy equivalent of about 340, and an alcoholic hydroxyl equivalent of about 700 obtained by the reaction of Bisphenol A and epichlorohydrin and 2 g of 2-methylimidazole to prepare a solution of a concentration of 50% by weight. In the same manner as in Example 1, the solution was stirred at 70° C. for 4 hours and the infrared absorption spectrum was measured to find that the isocyanate group had been masked. In quite the same manner as in Example 1, a glass cloth was impregnated with the solution, dried and pressed to obtain a double copper-clad laminate having a thickness of 1.6 mm. The performances of this double copper-clad laminate are shown in Table 1, which demonstrate that the laminate is particularly excellent in heat resistance and is also excellent in moisture resistance and electrical properties. As shown in Table 1, this prepreg is excellent in storage stability and shows that the change of flow of resin with the lapse of time is very slight.

EXAMPLE 4

In 850 g of MEK were dissolved 100 g of 2,4-tolylene diisocyanate, 750 g of diglycidyl ether having an average molecular weight of about 950, an epoxy equivalent of about 480 and an alcoholic hydroxyl equivalent of about 500 obtained by the reaction of Bisphenol A and epichlorohydrin, and 2 g of 2-methylimidazole to prepare a solution of a concentration of 50% by weight. In the same manner as in Example 1, the solution was stirred at 70° C. for 5 hours and the infrared absorption spectrum was measured to find that the isocyanate group had been masked. A varnish was prepared by adding to this solution 50 g of a polyvinyl compound obtained by thermal polymerization of p-vinylphenol and having an average molecular weight of about 8,000 and a hydroxyl equivalent of about 120. In quite the same manner as in Example 1, a glass cloth was impregnated with this varnish, dried and pressed to obtain a double copper-clad laminate having a thickness of 1.6 mm. As shown in Table 2, this double copper-clad laminate was excellent in heat resistance, toughness, moisture resistance, etc. As shown in Table 1, the change of flow of resin in this prepreg with the lapse of time was very small.

EXAMPLE 5

In 600 g of MEK were dissolved 100 g of diphenylmethane-4,4'-diisocyanate, 500 g of diglycidyl ether having an average molecular weight of about 950, an epoxy equivalent of about 480, and an alcoholic hydroxyl equivalent of about 500 obtained by the reaction of Bisphenol A and epichlorohydrin, and 2 g of 2-phenylimidazole, to prepare a solution of a concentration of 50% by weight. In the same manner as in Example 1, the solution was stirred at 70° C. for 6 hours and the infrared absorption spectrum was measured to find that the isocyanate group had been masked and a prepolymer stable at room temperature was formed. The solution was poured into n-hexane and the resulting prepolymer was recovered. A molding material was prepared by mixing together 200 g of this prepolymer, 70 g of a phenol novolac having a softening point of about 100° C., and a hydroxyl equivalent of about 100 synthesized by quite the same method as in Example 1, 500 g of powdery silica, 1 g of lithium chloride, 2 g of carbon black and 4 g of zinc stearate and kneading the resulting mixture on a hot roll at 70° C. for 10 minutes. The spiral flow just after the kneading was 82 cm. When this molding material was allowed to stand at room temperature for 30 days and thereafter its spiral flow was measured, the result was 80 cm, demonstrating that only a slight change took place. When this molding material was molded at 170° C. for 5 minutes and then after-baked at 170° C. for 16 hours, the glass transition point of the molded product was a high as 220° C. and the molded product showed such excellent resistance that none of the conventional epoxy resin molded artiles had.

EXAMPLE 6

In 600 g of MEK were dissolved 100 g of 4,4',4''-trimethyl-3,3',3''-triisocyanate 2,4,6-triphenyl isocyanurate (trimer of 2,4-tolylene diisocyanate), 500 g of diglycidyl ether having an average molecular weight of about 700, an epoxy equivalent of about 340, and an alcoholic hydroxyl equivalent of about 700 obtained by the reaction of Bisphenol A and epichlorohydrin, and 2 g of 2-methylimidazole, to prepare a solution of a concentration of 50% by weight. In the same manner as in Example 1, the solution was stirred at 70° C. for 10 hours and the infrared absorption spectrum was measured to find that the isocyanate group had been masked. A varnish was prepared by adding to this solution 40 g of 4,4'-diaminodiphenylmethane to obtain a homogeneous solution and then further adding thereto a solution of 100 g of N,N'-4,4'-diphenylmethane-bis-maleimide in 400 g of dimethylformamide. In quite the same manner as in Example 1, a glass cloth was impregnated with the varnish, dried and pressed to obtain a copper-clad laminate. As shown in Table 2, this copper-clad laminate was quite excellent in heat resistance and was also excellent in toughness, moisture resistance, etc. As shown in Table 1, the change of flow of resin in this prepreg with the lapse of time was very stight.

COMPARATIVE EXAMPLE 1

In 460 g of MEK were dissolved 200 g of 2,4-tolylene diisocyanate, 260 g of phenol, and 2 g of 2-methylimidazole to prepare a solution of a concentration of 50% by weight. In the same manner as in Example 1, the solution was stirred at 70° C. for 5 hours and the infrared absorption spectrum was measured to find that the isocyanate group had been masked. Then, a varnish was prepared by adding, to this solution, 400 g of diglycicyl ether having an average molecular weight of about 380, an epoxy equivalent of about 190, and an alcoholic hydroxyl equivalent of zero obtained by the reaction of Bisphenol A and epichlorohydrin. In quite the same manner as in Example 1, a glass cloth was impregnated with this varnish, dried and pressed to obtain a double copper-clad laminate having a thickness of 1.6 mm. However, many voids were formed in this double copper-clad laminate, and accordingly it was quite inferior in mechanical strength, soldering heat-resistance, etc. and could not be used practically.

COMPARATIVE EXAMPLE 2

In 700 g of MEK were dissolved 100 g of 2,4-tolylene diisocyanate, 600 g of diglycidyl ether having an average molecular weight of about 950, an epoxy equivalent of about 480, and an alcoholic hydroxyl equivalent of about 500 obtained by the reaction of Bisphenol A and epichlorohydrin, and 1 g of 2-methylimidazole to prepare a varnish of a concentration of 50% by weight.

Without heating nor stirring this varnish, glass cloth was impregnated with this varnish, dried and press-molded in the same manner as in Example 1 to obtain a copper-clad laminate. As shown in Table 2, this copper-clad laminate was so poor in moisture resistance that, when boiled for 30 minutes and then allowed to float on molten solder at 260° C., blisters occured in 20 seconds or less. This is probably because the isocyanate group was not masked beforehand, and hence, many free isocyanate groups remained in the final cured product. Further, as shown in Table 1, this prepreg showed a very great change with the lapse of time of flow of resin, and therefore, the flow reached 1/5 of the initial value in 5 hours.

COMPARATIVE EXAMPLE 3

In 550 g of MEK were dissolved 100 g of 2,4-tolylene diisocyanate, 450 g of monoglycidyl ether of Bisphenol A having a molecular weight of about 280, an epoxy equivalent of about 280, a phenolic hydroxyl equivalent of about 280, and 1 g of 2-methylimidazole, to prepare a solution of a concentration of 50% by weight. In the same manner as in Example B 1, the solution was heated and stirred a 70° C. for10 hours and then the infrared absorption spectrum was measured to find that the isocyanate group had been masked. Then, a varnish was prepared by adding 30 g of 4,4'-diamino diphenylsulfone to this solution, with which a glass cloth was impregnated, dried and press molded to obtain a copper-clad laminate in the same manner as in Example 1. As shown in Table 2, this copper-clad laminate was quite poor in water resistance, so that when boiled for 30 minutes and then allowed to float on molten solder at 260° C., blisters appeared in 20 seconds or less. This is probably because the isocyanate was masked with phenolic hydroxyl group, and hence, the urethane linkage had a lower dissociation temperature, so that the masked isocyanate group was partially changed into free isocyanate group during the impregnation of glass cloth and drying, and the free isocyanate group remained in the cured product to result in a decrease in water resistance.

COMPARATIVE EXAMPLE 4

In 850 g of MEK were dissolved 100 g of 4,4'-diaminodiphenylsulfone which was conventionally used as a curing agent for epoxy resins, 750 g of diglycidyl ether having an average molecular weight of about 950, an epoxy equivalent of about 480 obtained by the reaction of Bisphenol A and epichlorohydrin, and 2 g of 2-methylimidazole, to prepare a varnish of a concentration of 50% by weight. In the same manner as in Example 1, a glass cloth was impregnated with this varnish, dried and press-molded to obtain a copper-clad laminate. The performance of this copper-clad laminate are shown in Table 2, which demonstrates that, as compared with the cured product obtained by the curing process of this invention, it is much inferior in heat rsistances such as hot flexural strength.

COMPARATIVE EXAMPLE 5

A molding material was prepared by mixing together 100 g of 4,4',4''-trimethyl-3,3',3''-triisocyanate 2,4,6-triphenyl isocyanurate, 130 g of polyglycidyl ether of cresol novolac having an average molecular weight of about 1,400, an epoxy equivalent of about 230, and an alcoholic hydroxyl equivalent of zero, 2 g of 2-methylimidazole, 450 of powdery silica, 1 g of lithium chloride, 0.5 g of carbon black and 1 g of zinc stearate and kneading the resulting mixture on a hot roll at 70° C. for 10 minutes. The spiral flow measured just after the kneading was 88 cm. However, when the molding material was allowed to stand at room temperature for 6 hours and thereafter the spiral flow was again measured, it was as small as 5 cm.

TABLE 1

| No. | Period of time take until the flow of resin in prepreg became 1/5 of the initial value |
|---|---|
| Example 1 | More than 60 days |
| Example 3 | More than 60 days |
| Example 4 | More than 60 days |
| Example 6 | More than 60 days |
| Comparative Example 2 | 0.2 days (5 hours.) |
| Comparative Example 3 | 25 days |
| Comparative Example 4 | More than 60 days |

Note:
[1] The flows were measured according to JIS C 6487.
[2] The prepregs were stored in an atmosphere at a temperature of 23° C. at a humidity of 60%.

TABLE 2

Performances of laminates

| Item of test | Unit | Conditions of treatment and measurement | Example 1-1 | Example 1-2 | Example 3 | Example 4 | Example 6 | Comparative Example 2 | Comparative Example 3 | Comparative Example 4 | Testing method |
|---|---|---|---|---|---|---|---|---|---|---|---|
| Insulation resistance | Ω | A | $3 \times 10^{14}$ | $4 \times 10^{14}$ | $5 \times 10^{14}$ | $2 \times 10^{14}$ | $7 \times 10^{14}$ | $1 \times 10^{14}$ | $2 \times 10^{14}$ | $1 \times 10^{14}$ | JIS |
| | | D - 2/100 | $2 \times 10^{12}$ | $2 \times 10^{12}$ | $3 \times 10^{12}$ | $6 \times 10^{12}$ | $5 \times 10^{12}$ | $2 \times 10^{10}$ | $3 \times 10^{10}$ | $2 \times 10^{12}$ | C-6481 |
| Dielectric constant (1 MHz) | — | A | 4.5 | 4.5 | 4.3 | 4.6 | 4.4 | 4.6 | 5.1 | 4.8 | JIS |
| | | D - 48/50 | 4.7 | 4.7 | 4.5 | 4.8 | 4.5 | 5.3 | 5.5 | 4.9 | C-6481 |
| Dielectric tangent (1 MHz) | — | A | 0.012 | 0.013 | 0.007 | 0.012 | 0.008 | 0.009 | 0.022 | 0.028 | JIS |
| | | D - 48/50 | 0.014 | 0.014 | 0.008 | 0.014 | 0.009 | 0.035 | 0.038 | 0.035 | C-6481 |
| Flexural strength | kg/mm | A | 55 | 55 | 52 | 54 | 52 | 53 | 52 | 56 | JIS |
| | | E-1/150 at 150° C. | 32 | 33 | 40 | 38 | 45 | 34 | 5 | 6 | C-6481 |
| | | E-1/200 at 200° C. | 16 | 17 | 22 | 20 | 38 | 16 | 3 | 3 | |
| Soldering heat-resistance | — | 260° C., 60 sec float | No change | No change | No change | No change | No change | No change | No change | No change | JIS C-6481 |
| | | D-0.5/100 treatment followed by 260° C., 60 sec float | No change | No change | No change | No change | No change | Blistered | Blistered | No change | |
| | | D-2/100 treatment followed by 260° C., 60 sec float | No change | No change | No change | No change | No change | Blistered | Blistered | No change | |
| Flexural strength of copper foil | kg/cm | A | 1.8 | 1.8 | 1.6 | 1.6 | 1.7 | 1.2 | 1.6 | 1.8 | JIS |
| | | E-1/150 at 150° C. | 1.5 | 1.5 | 1.4 | 1.4 | 1.5 | 1.0 | 0.3 | 0.6 | C-6481 |
| Chemical resistance | — | Boiling in trichlene for 5 minutes | No change | No change | No change | No change | No change | No change | Swollen | No change | JIS C-6481 |
| Punching quality | — | A | Good | Good | Fair | Good | Good | Very poor | Good | Good | D-617 |

Note:
Example 1-1: In Example 1, the sample molded just after prepreg preparation.
Example 1-2: In Example 1, the sample molded after allowing prepreg to stand at room temperature for 60 days.

It is apparent from the Examples and the Comparative Examples that, according to the process of this invention, there can be obtained the B-stage compounds such as heat resistant varnish, prepreg, molding material and the like quite stable at room temperature, and that the final cured product is excellent in toughness, heat resistance, moisture resistance, adhesiveness, etc. Therefore, it is very useful as copper-clad laminate as well as in other various uses such as electrical insulating material, cast article, structural material, and the like.

What is claimed is:

1. A crosslinked resin obtained by subjecting to reaction one equivalent of an isocyanate compound having isocyanate groups in the molecule with 0.5 to 10 epoxy equivalents of an epoxy compound having alcoholic hydroxyl groups and epoxy groups in the molecule, to first react the isocyanate groups of the isocyanate compound with the alcoholic hydroxyl groups of the epoxy compound, thereby forming an epoxy prepolymer having urethane linkages stable at room temperature; subsequently heating the resulting prepolymer at a temperature at least 40° C. higher than the reaction temperature for the formation of the prepolymer to dissociate the urethane linkages and regenerate the isocyanate groups; and then reacting the said isocyanate groups with the epoxy groups of the epoxy compound.

2. A crosslinked resin according to claim 1, wherein the epoxy compound having both epoxy groups and alcoholic hydroxyl groups is at least one compound selected from glycidyl ethers obtained by reaction between Bisphenol A or F or hydrogenated Bisphenol A and β-methyl-substituted or unsubstituted epichlorohydrin, and brominated products of these epoxy compounds.

3. A crosslinked resin according to claim 1, wherein the epoxy compound is a diglycidyl ether obtained by reaction between Bisphenol A and epichlorohidrin, and having an average molecular weight of 400 to 1,000.

4. A crosslinked resin according to claim 1, 2 or 3, wherein the isocyanate compound is an isocyanate compound having an isocyanurate ring in the molecule.

5. A crosslinked resin according to claim 1, 2 or 3, wherein the isocyanate compound is a trimer of 2,4-tolylene diisocyanate, 2,5-tolylene diisocyanate, 2,6-tolylene diioscyanate or 3,5-tolylene diisocyanate, a trimer of hexane-1,6-diioscyanate or a copolymer of 2,4-tolylene, 2,5-tolylene, 2,6-tolylene or 3,5-tolylene diisocyanate and hexane-1,6-diisocyanate.

6. A crosslinked resin according to claim 1, wherein the dissociation of the urethane linkages of the epoxy prepolymer to regenerate the isocyanate groups and the reaction between the regenerated isocyanate groups and the epoxy groups are carried out in the presence of at least one compound selected from the group consisting of amine compounds, carboxylic acid anhydrides, phenol-novolac compounds and polyvinyl-phenol compounds in a proportion of 0.1 to 2 equivalents in terms of amine equivalent, acid anhydride equivalent, or hydroxy equivalent per equivalent of the epoxy group of the prepolymer.

7. A crosslinked resin according to claim 6, wherein the dissociation of the urethane linkages of the prepolymer to regenerate the isocyanate groups and the reaction between the regenerated isocyanate groups and the epoxy groups are carried out in the presence of at least one compound selected from the group consisting of amine compounds, carboxylic acid anhydrides, phenol novolac compounds and polyvinyl-phenol compounds in a proportion of 0.1 to 2 equivalents in terms of amine equivalent, acid anhydride equivalent or hydroxy equivalent per equivalent of the epoxy group of the prepolymer.

8. A crosslinked resin according to claim 6, wherein the curing agent is an amine.

9. A crosslinked resin according to claim 8, wherein the amine is an aromatic amine.

10. A crisslinked resin according to claim 9, wherein the aromatic amine is diaminodiphenyl ether, diaminodiphenylsulfone, diaminodipenylmethane or methylenebis(o-chloroaniline).

11. A crosslinked resin according to claim 1, wherein the dissociation of the urethane linkages of the epoxy prepolymer to regenerate the isocyanate groups and the reaction between the regenerated isocyanate groups and the epoxy groups are carried out in the presence of 100 parts by weight or less of a bisimide compound per 10 parts by weight of the prepolymer.

12. A crosslinked resin according to claim 11, wherein the bisimide is N,N'-4,4'-diphenylmethane-bis-maleimide, N,N'-4,4'-diphenyl ether-bismaleimide or N,N'-4,4'-diphenylsulfone-bismaleimide.

13. A process for producing a cross-linked epoxy resin which comprises subjecting to reaction one equivalent of an isocyanate compound having isocyanate groups in the molecule, and an epoxy compound having alcoholic hydroxyl groups and epoxy groups in the molecule in an amount corresponding to 0.5 to 10 epoxy equivalents and 0.2 to 3 alcoholic hydroxy equivalents, to react the alcoholic hydroxyl groups of the epoxy compound with the isocyanate groups of the isocyanate compound, thereby forming an epoxy prepolymer having urethane linkages stable at room temperature; heating the prepolymer at a temperature at least 40° C. higher than the reaction temperature for the formation of the prepolymer, to dissociate the urethane linkages and regenerate the isocyanate groups; and then reacting the said isocyanate groups with the epoxy groups of the epoxy compound.

14. A process according to claim 13, wherein the dissociation of the urethane linkages to regenerate the isocyanate groups and the reaction between the regenerated isocyanate groups and the epoxy groups are carried out in the presence of at least one compound selected from the group consisting of amine compounds, carboxylic acid anhydrides, phenol novolac compounds and polyvinyl-phenol compound in a proportion of 0.1 to 2 equivalents in terms of amine equivalent, acid anhydride equivalent or hydroxy equivalent per equivalent of the epoxy group of the prepolymer.

15. A process according to claim 13, wherein the dissociation of the urethane linkages to regenerate the isocyanate groups and the reaction between the regenerated isocyanate groups and the epoxy groups are carried out in the presence of 100 parts by weight or less of a bisimide compound per 10 parts by weight of the prepolymer.

16. A process according to claim 13, wherein the dissociation of the urethane linkages to regenerate the isocyanate groups and the reaction between the regenerated isocyanate groups and the epoxy groups are carried out in the presence of 100 parts by weight or less of a bisimide per 10 parts by weight of the prepolymer and in the presence of at least one compound selected from the group consisting of amine compounds, carboxylic acid anhydrides, phenol novolac compounds and polyvinyl-phenol compounds in a proportion of 0.1 to 2 equivalents in terms of amine equivalent, acid anhydride equivalent or hydroxy equivalent per equivalent of the epoxy group of the prepolymer.

17. A process for producing a laminate which comprises subjecting to reaction one equivalent of an isocyanate compound having isocyanate groups in the molecule and an epoxy compound having epoxy groups and alcoholic hydroxyl groups in the molecule in an amount corresponding to 0.5 to 10 epoxy equivalents and 0.2 to 3 alcoholic hydroxy equivalents to first react the alcoholic hydroxyl groups of the epoxy compound with the isocyanate groups of the isocyanate compound, thereby forming an epoxy prepolymer having urethane linkages stable at room temperature; thereafter heating the prepolymer at a temperature at least 40° C. higher than the reaction temperature for the formation of the prepolymer to dissociate the urethane linkages and regenerate the isocyanate groups; reacting the regenerated isocyanate groups with the epoxy groups if necessary in the presence of 100 parts by weight or less, per 10 parts by weight of the prepolymer, of a bisimide and/or 0.1 to 2 equivalents, in terms of amine equivalent, acid anhydride equivalent or hydroxy equivalent, per equivalent of the epoxy group of the prepolymer, of at least one compound selected from the group consisting of amine compounds, carboxylic acid anhydrides, phenol novolac compounds and polyvinyl-phenol compounds; impregnating a fibrous substrate with the resulting resin composition; superposing at least one sheet of the resin-impregnated substrate on a metallic foil; and pressing the resulting assembly with heating.

* * * * *